US012115547B2

(12) United States Patent
Muck

(10) Patent No.: US 12,115,547 B2
(45) Date of Patent: Oct. 15, 2024

(54) COMPONENT OF A WATER FEATURE AND WATER FEATURE WITH SUCH A COMPONENT

(71) Applicant: OASE GmbH, Hörstel-Riesenbeck (DE)

(72) Inventor: Thorsten Muck, Ibbenbüren (DE)

(73) Assignee: OASE GmbH, Hörstel-Riesenbeck (DE)

(*) Notice: Subject to any disclaimer, the term of this patent is extended or adjusted under 35 U.S.C. 154(b) by 792 days.

(21) Appl. No.: 17/147,756

(22) Filed: Jan. 13, 2021

(65) Prior Publication Data

US 2021/0225213 A1 Jul. 22, 2021

(30) Foreign Application Priority Data

Jan. 20, 2020 (DE) ..................... 20 2020 100 280.5

(51) Int. Cl.

| | |
|---|---|
| ***B05B 15/65*** | (2018.01) |
| ***B05B 17/08*** | (2006.01) |
| ***F21V 23/06*** | (2006.01) |
| *F21W 121/02* | (2006.01) |

(52) U.S. Cl.

CPC .............. *B05B 15/65* (2018.02); *B05B 17/08* (2013.01); *F21V 23/06* (2013.01); *F21W 2121/02* (2013.01)

(58) Field of Classification Search

CPC ......... B05B 15/65; B05B 17/08; F21V 23/06; F21W 2121/02

USPC ..................................................... 239/17–23

See application file for complete search history.

(56) References Cited

U.S. PATENT DOCUMENTS

| | | | | |
|---|---|---|---|---|
| 8,403,237 | B2 | 3/2013 | Ficyk et al. | |
| 2006/0163375 | A1* | 7/2006 | Skluzacek | B05B 17/08 239/18 |
| 2007/0018365 | A1 | 1/2007 | Pugliese | |
| 2011/0240757 | A1* | 10/2011 | Selk | B05B 17/08 239/18 |
| 2018/0313103 | A1 | 11/2018 | Marshall et al. | |

* cited by examiner

*Primary Examiner* — Christopher S Kim
(74) *Attorney, Agent, or Firm* — Gudrun E. Huckett

(57) ABSTRACT

A component of a water feature for generating an illuminated water image is provided with a housing and an illumination unit fixedly arranged in the housing. A water channel passes through the housing and has at least in sections thereof a round cross section. At least one projection is arranged in at least one length section of the water channel, wherein the at least one projection projects toward a longitudinal center axis of the water channel. The at least one projection forms a part of a nozzle receptacle. The water channel in the at least one length section where the at least one projection is provided has at least in sections thereof no round cross section. A water feature provided with the component is provided with a plug-in nozzle insert inserted from below into the component or an insertable nozzle insert inserted from above into the component.

15 Claims, 6 Drawing Sheets

COMPONENT OF A WATER FEATURE AND WATER FEATURE WITH SUCH A COMPONENT

BACKGROUND OF THE INVENTION

The invention relates to a component of a water feature for generating an illuminated water image, wherein the component is configured in particular for horizontal installation, for example, in a flooring. The component comprises an illumination unit which is fixedly arranged in the housing and a water channel which passes through the housing in particular centrally and has at least in sections thereof a round cross section. Moreover, the invention concerns a water feature with such a component and a nozzle insert inserted into the component for producing a water image.

Such water features are used in private spaces as well as in public spaces for staging gardens or squares. Depending on the employed water nozzle, a plurality of water images can be generated in which, for example, the height, the opening angle and/or the exit vector of the water exiting from the water feature varies, wherein the water is interacting in different ways, respectively, with the light emitted by the illumination unit. In the private sector, water features with exchangeable water nozzles in the form of plug-in nozzle attachments are known in which the nozzle attachment is placed onto an end of the water channel and clamped thereon. Since such nozzle attachments can however be easily removed again, they are not safe with respect to vandalism and are unsuitable for easily accessible parts of private gardens or public spaces. Therefore, usually nozzles are used in these spaces that are a fixed component of the water feature. For changing the water image, the entire water feature must therefore be removed and exchanged.

It is therefore object of the present invention to provide a water feature or a component for such a water feature that enables a high variability of the water image by employing various nozzle inserts and in which the nozzle inserts cannot be removed too easily. Also, it is the object of the invention to provide a water feature suitable for the private sector or a component for such a water feature in which the nozzle inserts can be installed even by laypersons in a simple way and with proper fit.

SUMMARY OF THE INVENTION

In accordance with the invention, this object is solved for a component of a water feature of the aforementioned kind in that the component comprises at least one projection in at least one length section of the water channel that projects toward a longitudinal center axis of the water channel and is a part of a nozzle receptacle so that the water channel in the length section in which the projection is located does not comprise a round cross section at least in sections thereof.

The invention is further solved for a water feature of the aforementioned kind in that it comprises a component according to the invention and a plug-in nozzle insert inserted into the component from a bottom side of the housing and fixed by means of a bottom securing element to the housing.

The object is further solved for a water feature of the aforementioned kind in that it comprises a component according to the invention and an insertable nozzle insert that is inserted from the top side of the housing into the component.

The component according to the invention of a water feature comprises in at least one length section of the water channel at least one projection, projecting toward the longitudinal center axis of the water channel, as a part of a nozzle receptacle in such a way that the water channel in the length section in which the projection is located comprises no round cross section at least in sections thereof. In this way, a nozzle receptacle is provided into which a nozzle insert can be inserted in a simple way with proper fit. In particular, the nozzle insert is brought for this purpose into a form fit engagement with the projection in an installation position and is thus secured against rotation about the longitudinal center axis of the water channel. In this way, at least a defined alignment of the water nozzle about the water channel center axis can be constructively predetermined, for example, when the water is supposed to exit in a defined direction relative to the component. This ensures a correct assembly of the water feature even by a layperson. A complete circumferentially extending thread as such does not yet constitute a projection in the meaning of the invention. Length sections of the water channel which have a thread extending completely about the circumference are therefore understood herein also as round.

Preferably, the projection is formed as one piece together with the housing. The housing is in particular an installation housing that in an installation situation of the component is accommodated mostly in an installation receptacle, for example, a receptacle in a flooring.

According to a further advantageous embodiment of the invention, the projection comprises an inner contour which, at least in sections thereof, adjoins a plane which extends, at least in a perspective transverse to the longitudinal center axis of the water channel, parallel to the longitudinal center axis of the water channel. In this way, it is possible that a nozzle insert which is to be brought into form fit engagement can be adapted in a simple way to the component. For this purpose, it is only required to provide a recess with a flat surface at the nozzle insert such that the flat surface in the installation position contacts the inner contour of the projection. Also, an inner contour configured in this way provides a reliable guiding contour for the nozzle insert upon insertion into the component.

In a further preferred embodiment of the invention, the projection comprises an abutment surface that extends perpendicularly to the longitudinal center axis of the water channel or extends toward the longitudinal center axis. Such an abutment surface forms a stop for a nozzle insert inserted into the component whereby the nozzle insert can be exactly positioned along the water channel center axis. In particular, a nozzle insert which is inserted from the bottom side into the component is secured against removal from above in this way.

Preferably, the abutment surface adjoins the inner contour and forms thus a shoulder thereat so that a particularly compact configuration of the component is achieved. It is particularly advantageous when the abutment surface extends perpendicularly to the longitudinal center axis of the water channel and adjoins the inner contour because a nozzle insert to be brought into form fit engagement with the projection can be produced particularly easily. For this purpose, the nozzle insert must only be provided with a recess comprising two planar surfaces which are extending perpendicularly to each other wherein, in the installation position of the nozzle insert, one surface of the recess is resting at the inner contour and the other at the abutment surface, respectively.

In a further preferred embodiment of the invention, at least one part of a thread is provided in the projection. In this way, a further indirect or direct fastening possibility for a nozzle insert is provided. For example, a nozzle insert can be directly screwed from above into the thread in the projection. Alternatively, a nozzle insert can be inserted from above into the component and can be fixed therein by means of a top securing element screwed into the thread. In particular, a thread segment is provided in an inner wall of the projection. The thus configured projection fulfills thus at least two functions. On the one hand, the projection provides, by means of its inner contour, the possibility for securing a nozzle insert inserted into the component against rotation about the water channel center axis and, on the other hand, it provides a further indirect or direct fastening possibility for a nozzle insert.

In a preferred embodiment of the invention, the projection adjoins an end of the water channel extending in the housing, wherein the end is facing toward a light-emitting top side of the housing, i.e., the top side where light emitted by the illumination unit exits from the housing. The position of the projection in the water channel is thereby easily recognizable at the top side of the housing which simplifies insertion of a nozzle element that is configured for form fit engagement of the projection. In particular in combination with a thread in the projection, the projection in this position is optimally accessible for indirect or direct fastening of a nozzle insert from above.

Preferably, the projection or the projections are designed such that, in the length section of the water channel in which it/they is/are located, the projection(s) interrupt/s the otherwise round cross section of the water channel. Since nozzle inserts are preferably provided with a mostly round cross section for seal-tight contact in the water channel, it is thus possible with little expenditure to properly position a nozzle insert to be inserted into the component in the water channel, in particular in a form fit manner. In particular in combination with a thread provided in the projection, the otherwise round cross section of the water channel provides for easy screwing of a nozzle insert or of a securing element into the thread.

Preferably, at least two, preferably at least three, particularly preferred four projections are provided. In particular in case of nozzles that have a symmetry, it is thus possible to constructively predetermine several alignment positions about the water channel center axis. For example, in case of a slot nozzle, it is irrelevant whether it is installed in a defined alignment position or rotated by 180°. In case of threads provided in the projections, several thread segments arranged about the water channel center axis are thus provided for improved fastening of the nozzle insert.

According to a further advantageous embodiment of the invention, the component comprises at the bottom side, in particular an installation side of the housing, facing away from the light-emitting top side of the housing, an electrical contact at least for the illumination unit. The electrical contact is positioned at a distance a from the water channel wherein the distance is measured perpendicular to the longitudinal center axis of the water channel. The distance amounts to at least half a length of the lower water channel radius, preferably at least two thirds of the length of the lower water channel radius, particularly preferred at least corresponds to the length of the lower water channel radius. Due to the electrical connector being positioned at a distance from the water channel, current-supplying or data-transmitting cables that are possibly connected to the electrical connector are not in the way when inserting and optionally fixing the nozzle insert in the component. The lower water channel radius is the radius of the water channel that is extending though the housing measured at the end of the water channel facing toward the bottom side of the housing.

As a whole, with the component according to the invention an extremely variably usable nozzle receptacle is provided which, on the one hand, provides a stop as well as an alignment aid in particular for nozzle inserts that are to be inserted from below and, on the other hand, provides for indirect or direct fastening possibilities for nozzle inserts that can be screwed in or inserted from above. Due to the combination of the aforementioned functions in one and the same element, i.e., the projection, a particularly compact configuration of the water feature is moreover possible.

The aforementioned object is also solved by a water feature for generating an illuminated water image comprising a component according to the invention and further comprising a plug-in nozzle insert that is inserted from the bottom side of the housing into the component and is fixed by means of a bottom securing element at the housing. It comprises a component as described above in accordance with the invention as well as a plug-in nozzle insert inserted from the bottom side of the housing and fixed by means of a bottom securing element at the housing. In particular, the bottom securing element is configured as a securing ring. Preferably, the bottom securing element for fixation of the plug-in nozzle insert is screwed into a thread of the water channel which, in the installation position of the plug-in nozzle insert, is below the plug-in insert. Alternatively, the bottom securing element can be a spring ring, for example.

In a preferred embodiment of the invention, the plug-in nozzle insert comprises at least one recess that can be brought into form fit engagement with the projection of the component in an installation position in such a way that a rotation of the nozzle insert about the longitudinal center axis of the water channel is prevented.

Furthermore, the object according to the invention is solved by a water feature for generating an illuminated water image comprising a component according to the invention and further comprising an insertable nozzle insert inserted from the top side of the housing into the component. The water feature comprises a component in accordance with the invention as disclosed above and an insertable nozzle insert inserted from the top side of the housing into the component. In particular in combination with a thread which is provided in the projection, the insertable nozzle insert is preferably configured as an insertable nozzle insert that can be screwed into the thread of the projection.

In an advantageous embodiment of the invention, the insertable nozzle insert is fixed by means of a top securing element at the housing. In particular in combination with a thread which is provided in the projection, the top securing element, which is embodied preferably as a securing ring, is screwed in this context into the thread of the projection.

It is expressly noted that the afore described embodiments of the invention can be combined each individually, but also in any technically expedient combination among each other, with the subject matter according to at least one of the independent claims. Further modifications and configurations of the invention can be taken from the following subject matter description and the drawings.

BRIEF DESCRIPTION OF THE DRAWING

Further advantages and details can be taken from the embodiments described in the following with the aid of the attached schematic drawings.

DESCRIPTION OF THE PREFERRED EMBODIMENTS

Figure 1:
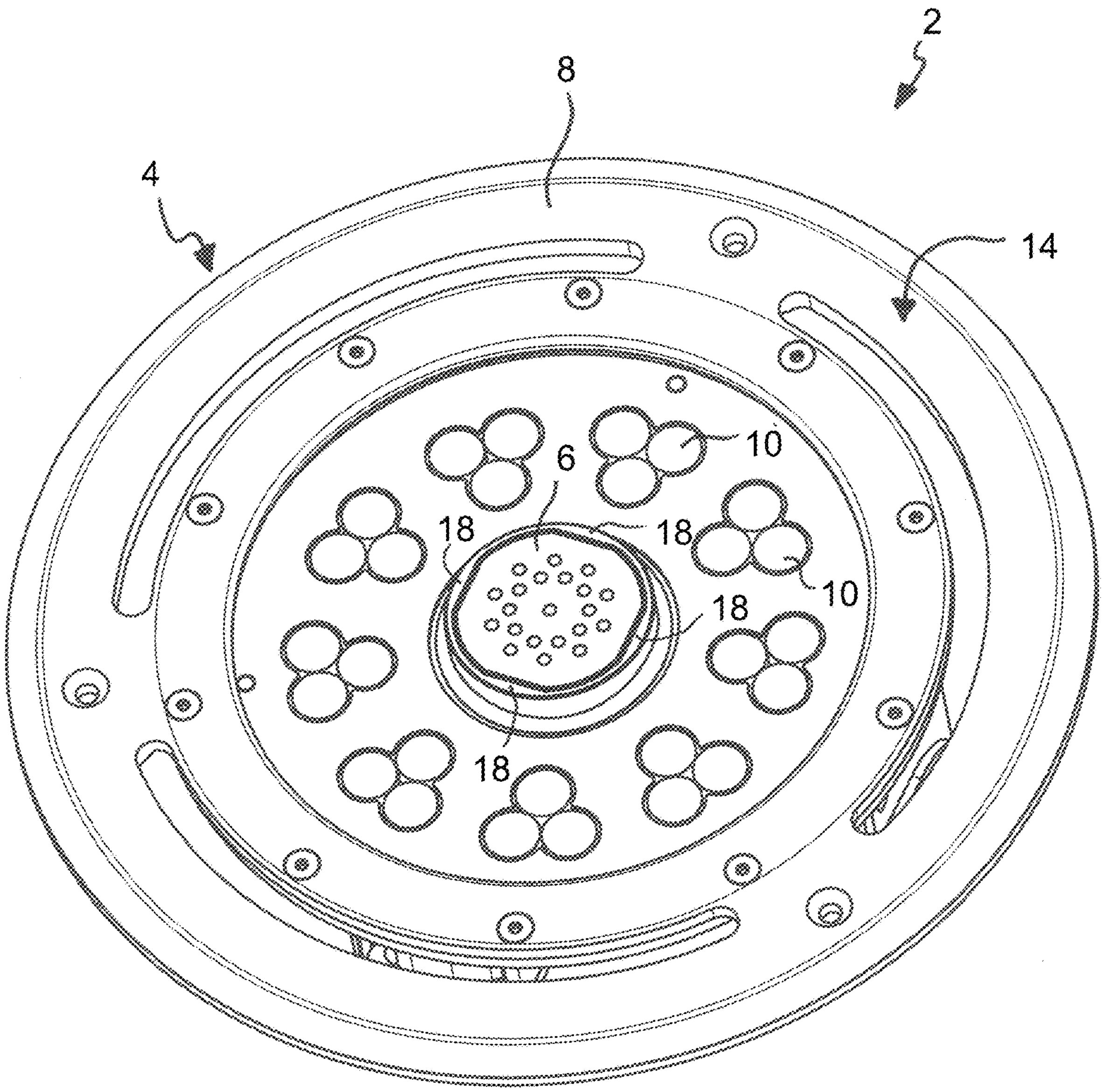
FIG. 1 shows a water feature according to the invention with inserted plug-in nozzle insert.

Parts that act in the same or a similar way are provided with identical reference characters, if expedient.

Individual technical features of the embodiments described in the following can also be combined in combination with the afore described embodiments as well as the features of the independent claims and dependent claims to subject matter in accordance with the invention.

FIG. 1 shows a water feature 2 according to the invention with a plug-in nozzle insert 6 inserted into a component 4. The component 4 comprises an illumination unit which is fixedly arranged in the housing 8 and is comprised of a plurality of LED (LED=light-emitting diode) groups 10, wherein the light-emitting side of the component 4 is its top side 14. As can be seen when looking at FIG. 3 also, the component 4 is penetrated centrally by a water channel 12. In a length section of the water channel 12 facing toward the top side 14, the component 4 comprises four projections 18 which are projecting toward the longitudinal center axis A of the water channel 12. In other respects, the water channel 12 comprises a round cross section wherein also the cross section of a length section with a continuous thread along the circumference is understood as round. The projections 18 that adjoin an upper end 16 of the part of the water channel 12 extending in the housing 8 form a part of a nozzle receptacle for the plug-in nozzle insert 6 that is to be inserted from the bottom side 15 of the housing 8.

Figure 2:
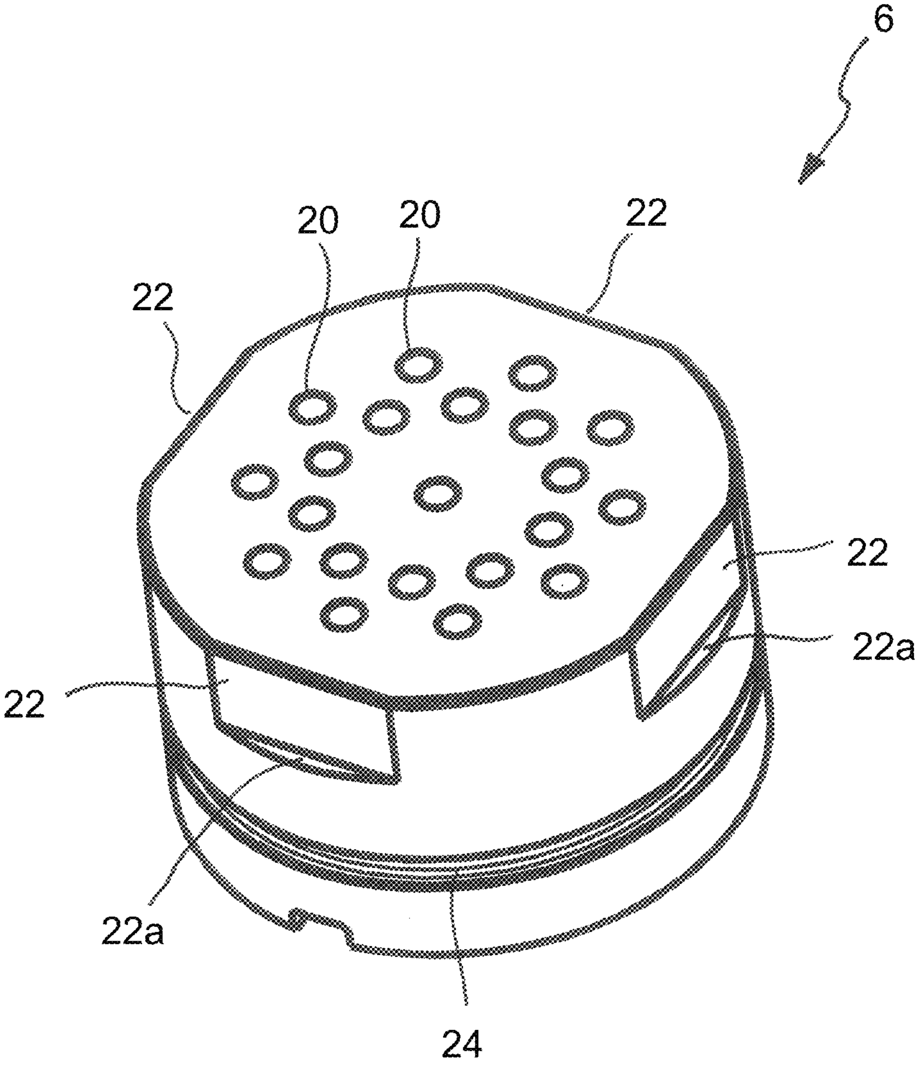
FIG. 2 shows a plug-in nozzle insert of the water feature of FIG. 1.

FIG. 2 shows the plug-in nozzle insert 6 of the water feature 2 of FIG. 1 in detail. The plug-in nozzle insert 6 has a cylindrical basic shape and comprises four recesses 22 at its end that is facing toward the nozzle exit openings 20; the recesses 22 can be brought into form fit engagement with the projections 18 of the component 4 in the installation position illustrated in FIGS. 1 and 4. Due to the thus achieved form fit engagement, a rotation of the plug-in nozzle insert 6 about the longitudinal center axis A of the water channel 12 is prevented. At its wall surface, the plug-in nozzle insert 6 comprises furthermore a groove 24 for receiving an annular seal.

Figure 3:
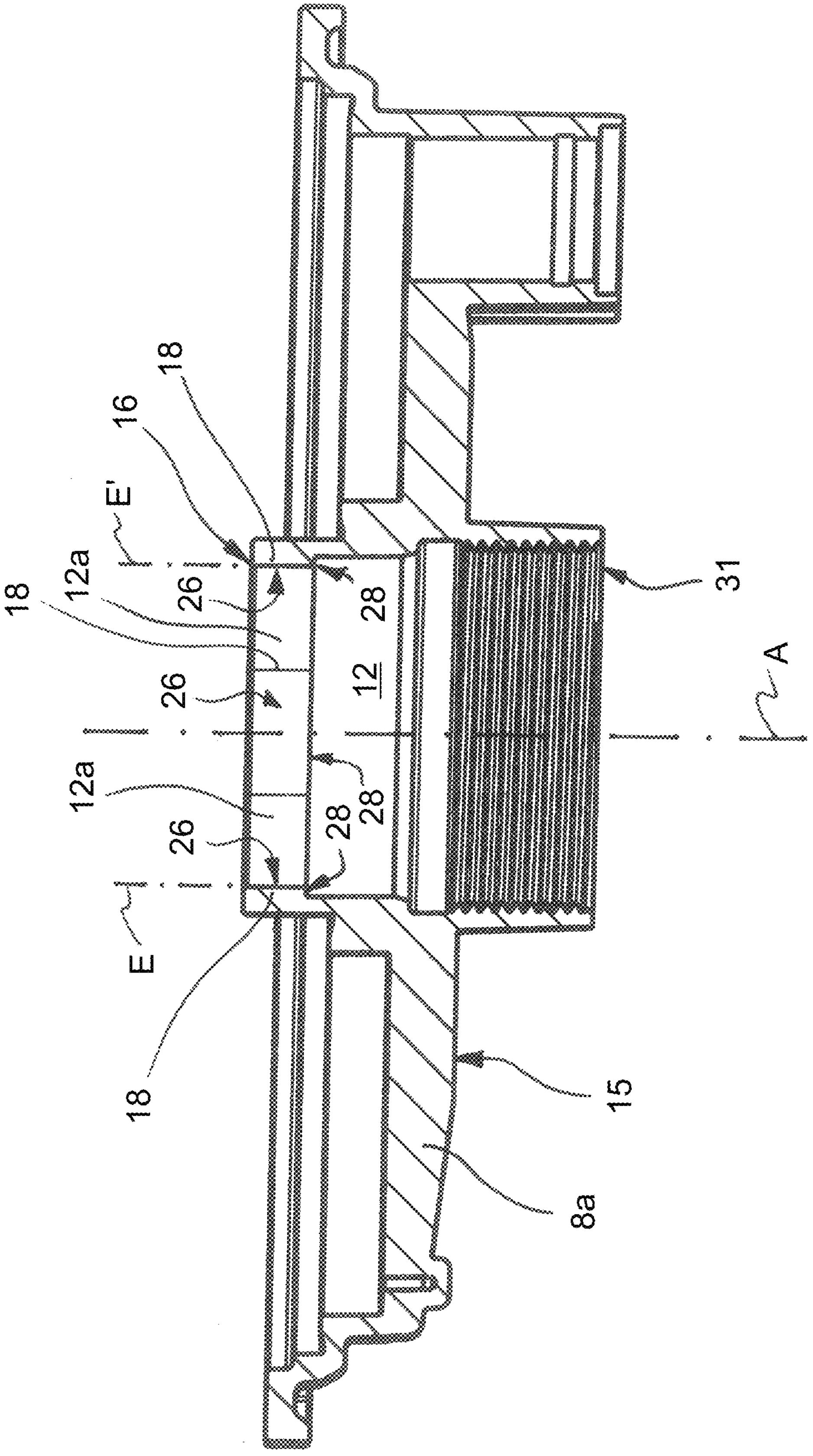
FIG. 3 shows a detail of the water feature according to the invention according to FIG. 1 in a cross section view.

FIG. 3 shows only the core housing 8*a* being a part of the housing 8 of the water feature 2 according to FIG. 1. The projections 18 which are projecting toward the longitudinal center axis A of the water channel 12 are formed as one piece together with the core housing 8*a* and project past the round circumferential sections 12*a* of the water channel 12. Each projection 18 comprises an inner contour 26 which adjoins a plane E, E' that, in at least one perspective transverse to the longitudinal center axis A, is parallel to the longitudinal center axis A. In the illustration according to FIG. 3, the projection 18 to the left of the longitudinal center axis A adjoins a first plane E while the projection 18 positioned to the right of the longitudinal center axis A adjoins the second plane E'. The first plane E as well as the second plane E' extend in this illustration or perspective parallel to the longitudinal center axis A. The projection 18 which in this illustration is positioned centrally behind the longitudinal center axis A adjoins, on the other hand, a further plane that is extending parallel to the image plane of FIG. 3.

Each of the projections 18 comprises moreover an abutment surface 28 which is perpendicular to the longitudinal center axis A. This abutment surface 28 forms a stop for the plug-in nozzle insert 6. In the installation position, the lower shoulders 22*a* of the plug-in nozzle insert 6 (FIG. 2) rest against the abutment surfaces 28. In this way, the plug-in nozzle insert 6 is secured against falling out or being removed from above.

Figure 4:
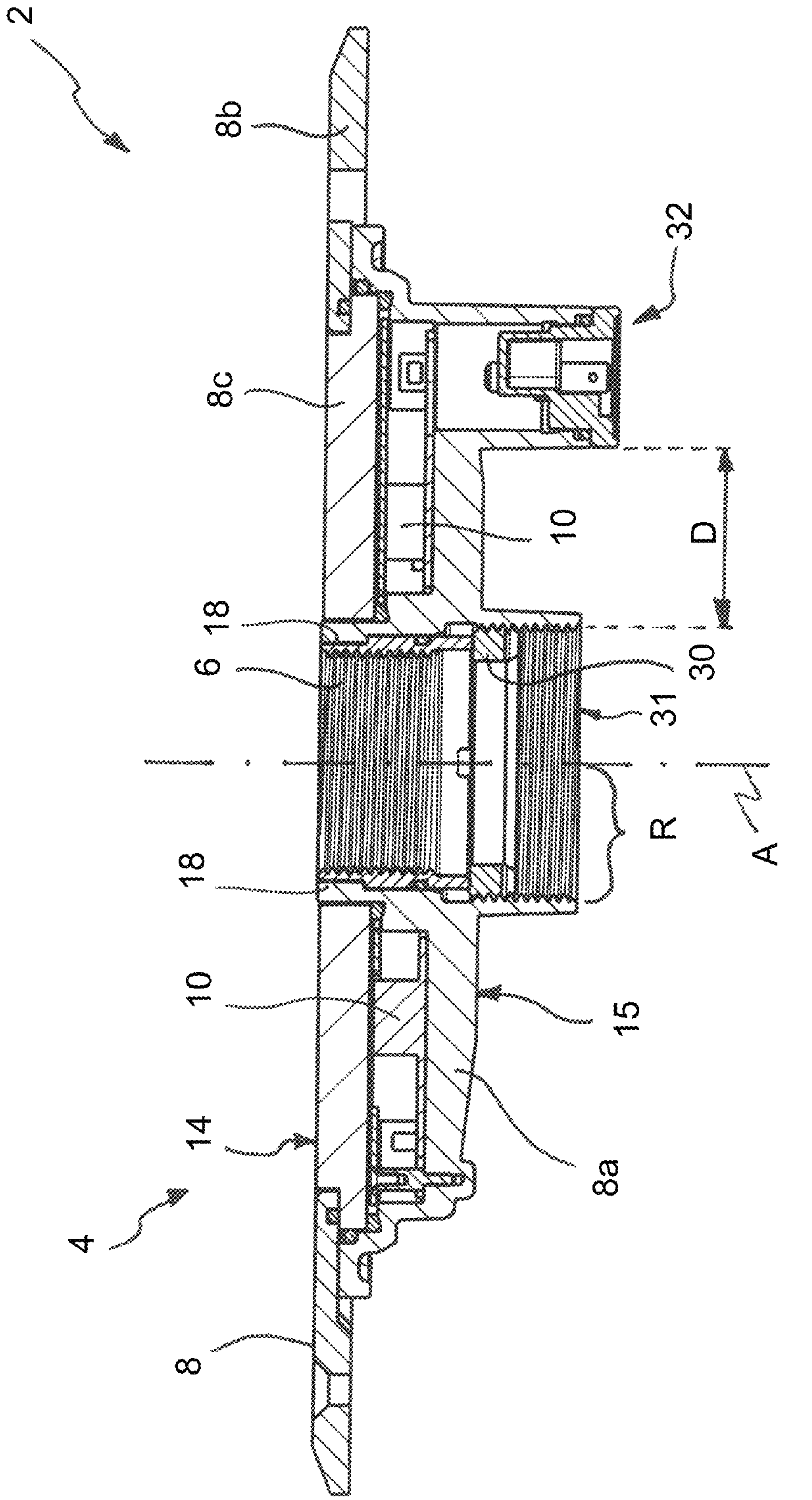
FIG. 4 shows the water feature according to the invention of FIG. 1 in a cross section view.

In FIG. 4, the housing 8 of the component 4 is shown which is comprised of the core housing 8*a*, a housing cover 8*b*, as well as a glazing 8*c*; the plug-in nozzle insert 6 is inserted into the housing 8. The plug-in nozzle insert 6 is fixed at the housing 8 by means of a bottom securing element 30, here in the form of a securing ring which can be screwed into the lower thread 31 of the water channel 12.

Moreover, FIG. 4 shows an electrical connector 32 at the bottom side 15 of the housing 8 positioned at a distance D from the water channel 12 wherein the distance D is somewhat larger than the length of the lower water channel radius R of the water channel 12.

Figure 5:
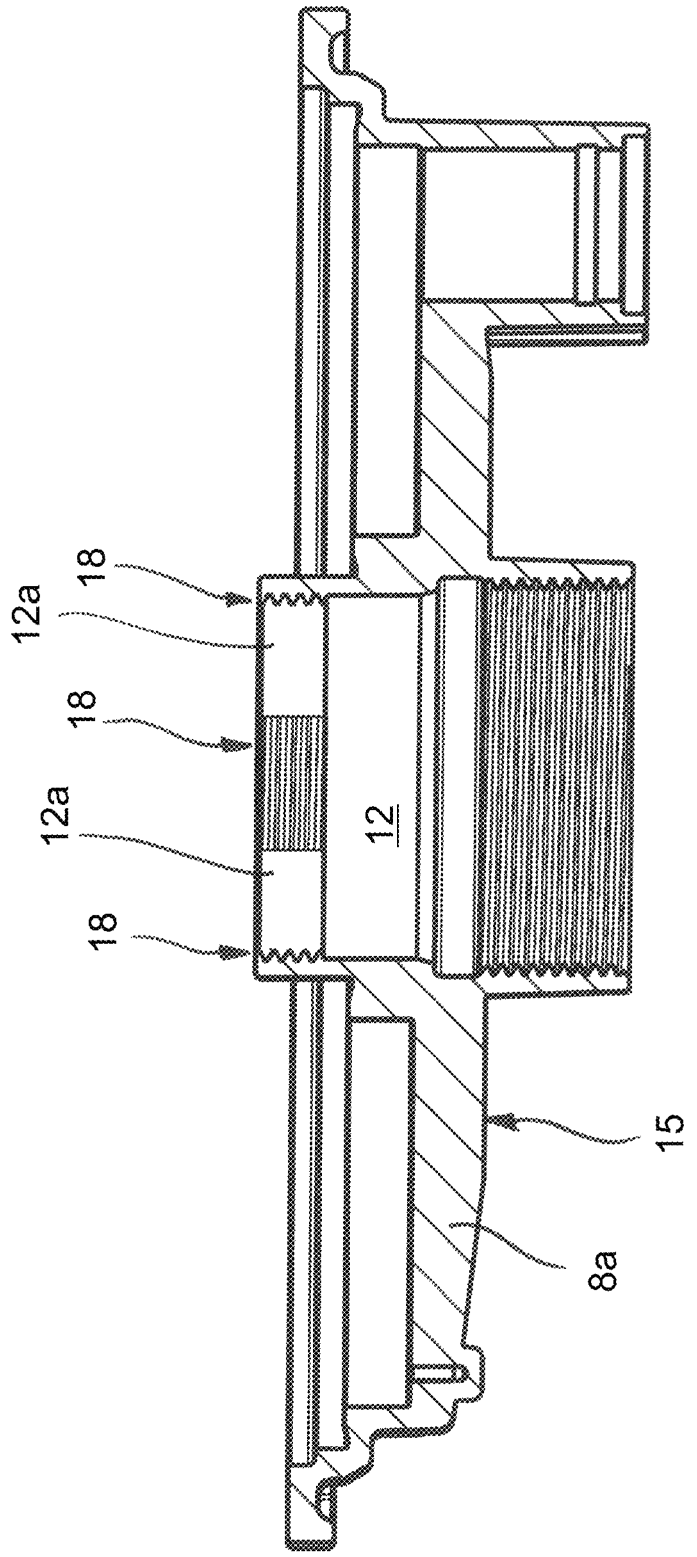
FIG. 5 shows a part of a further component according to the invention in a cross section view.

FIG. 5 shows the core housing 8*a* of a further embodiment of the invention in which the projections 18 each form a part of the thread. In this context, the projections 18 are provided with thread segments. The projections 18 form in this context a further fastening possibility for indirect or direct fixation of an insertable nozzle insert 36, illustrated in FIG. 6, that is insertable from above into the component 4. The projections 18 together with their inner contour 26 remain however in place in this context so that still a plug-in nozzle insert 6 to be inserted from below can be secured against rotation and falling out or pulling out.

Figure 6:
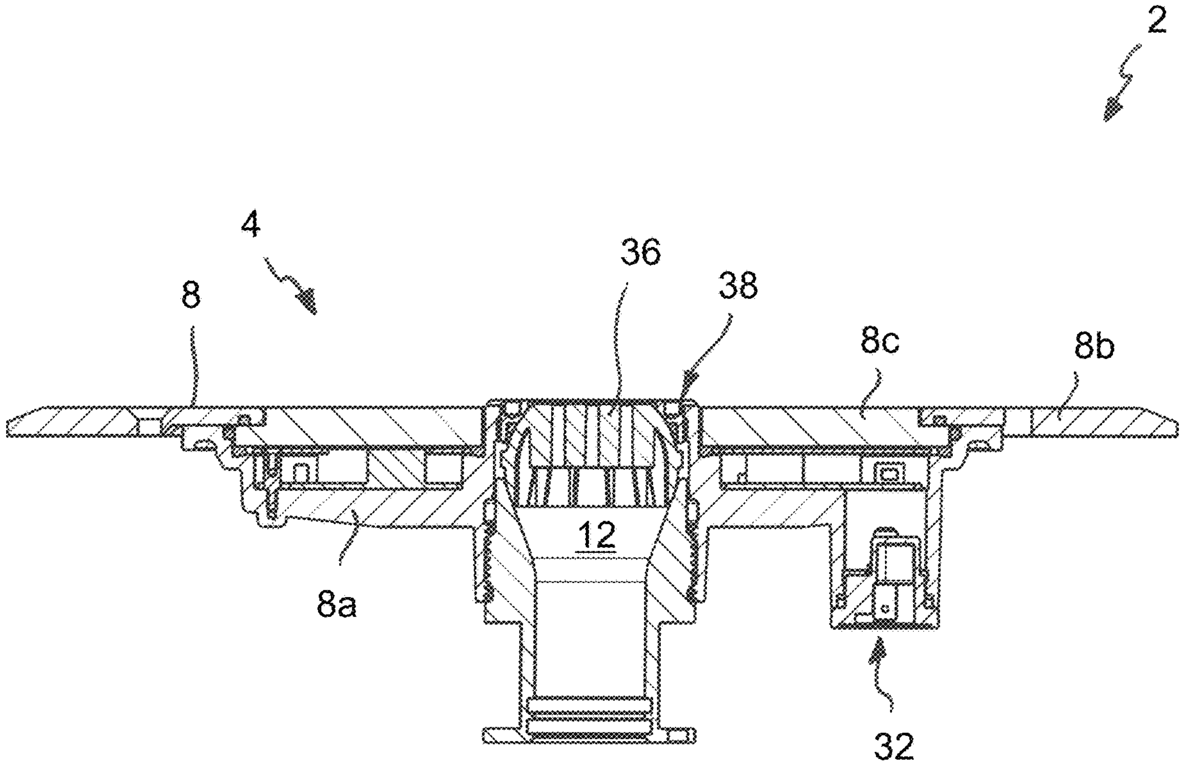
FIG. 6 shows a further water feature according to the invention with an insertable nozzle insert in a cross section view.

FIG. 6 shows a further water feature according to the invention with an insertable nozzle insert 36 inserted from above that, by means of a top securing element 38 screwed into the thread segments of the projections 18, is secured at the component, wherein the top securing element 38 is here in the form of a securing ring engaging around the insertable nozzle insert 36.

The specification incorporates by reference the entire disclosure of German priority document 20 2020 100 280.5 having a filing date of Jan. 20, 2020.

While specific embodiments of the invention have been shown and described in detail to illustrate the inventive principles, it will be understood that the invention may be embodied otherwise without departing from such principles.

What is claimed is:

1. A component of a water feature for generating an illuminated water image, the component comprising:

a housing comprising a water channel passing through the housing and comprising at least in sections thereof a round cross section;

an illumination unit fixedly arranged in the housing;

the water channel comprising a receptacle configured to receive a nozzle, wherein the receptacle is arranged in at least one length section of the water channel, wherein the receptacle has an inner contour comprised of at least one round circumferential section of the water channel and at least one projection adjoining the at least one round circumferential section of the water channel in a circumferential direction and projecting past the at least one round circumferential section of the water channel toward a longitudinal center axis of the water channel, wherein an inner contour of the at least one projection facing the longitudinal center axis extends in a plane extending parallel to the longitudinal center axis, wherein the at least one projection has a shape of a circular segment when viewed along the longitudinal center axis.

2. The component according to claim 1, wherein the at least one projection comprises an abutment surface extending perpendicularly to the longitudinal center axis of the water channel or extending toward the longitudinal center axis of the water channel.

3. The component according to claim 2, wherein the abutment surface adjoins the inner contour of the at least one projection.

4. The component according to claim 1, wherein the at least one projection comprises at least one thread segment.

5. The component according to claim 4, wherein the at least one thread segment is provided in an inner contour of the at least one projection, wherein the inner contour adjoins a plane which, in at least one perspective transverse to the longitudinal center axis of the water channel, extends parallel to the longitudinal center axis of the water channel.

6. The component according to claim 1, wherein the at least one projection adjoins an upper end of a part of the water channel extending in the housing, wherein the upper end is facing toward a light-emitting top side of the housing.

7. The component according to claim 1, wherein two or more than two of the at least one projection are provided.

8. The component according to claim 1, wherein the housing comprises a bottom side facing away from a light-emitting top side of the housing, wherein the component further comprises an electrical connector connected at least to the illumination unit, wherein the electrical connector is positioned at a distance away from the water channel, wherein the distance is measured perpendicularly to the longitudinal center axis of the water channel, and wherein the distance corresponds to at least half of a length of a lower water channel radius measured at an end of the water channel remote from the light-emitting top side of the housing.

9. The component according to claim 8, wherein the distance corresponds to at least two thirds of the length of the lower water channel radius.

10. The component according to claim 8, wherein the distance corresponds to at least the length of the lower water channel radius.

11. A water feature for generating an illuminated water image, the water feature comprising:

a component according to claim 1;

a plug-in nozzle insert inserted from a bottom side of the housing into the component;

a bottom securing element fixing the plug-in nozzle insert at the housing.

12. The water feature according to claim 11, wherein the plug-in nozzle insert comprises at least one recess configured to be brought into a form fit engagement with the at least one projection of the component in an installation position such that a rotation of the plug-in nozzle insert about the longitudinal center axis of the water channel is prevented.

13. A water feature for generating an illuminated water image, the water feature comprising:

a component according to claim 1;

an insertable nozzle insert inserted from a top side of the housing into the component.

14. The water feature according to claim 13, further comprising a top securing element fixing the insertable nozzle insert at the housing.

15. The water feature according to claim 14, wherein the at least one projection of the component comprises at least one thread segment, wherein the top securing element is screwed into the at least one thread segment of the at least one projection.

* * * * *